(No Model.)  2 Sheets—Sheet 1.
E. U. KINSEY.
LENS CABINET.
No. 593,024.  Patented Nov. 2, 1897.
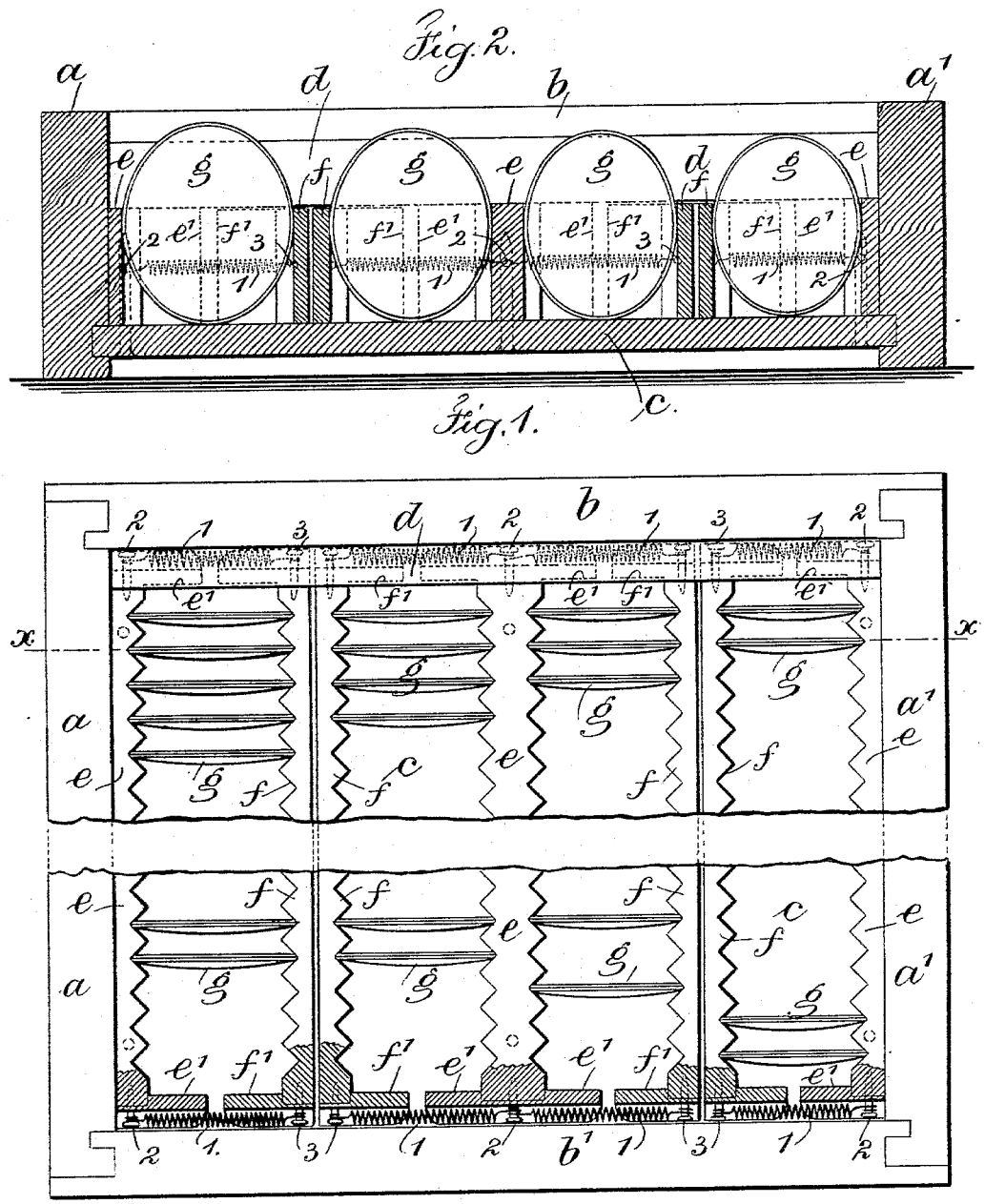
Witnesses
Chas. H. Smith
J. Staib
Inventor
Ernest U. Kinsey
per L. W. Serrell & Son
Attys (No Model.)  2 Sheets—Sheet 2.
E. U. KINSEY.
LENS CABINET.
No. 593,024.  Patented Nov. 2, 1897.
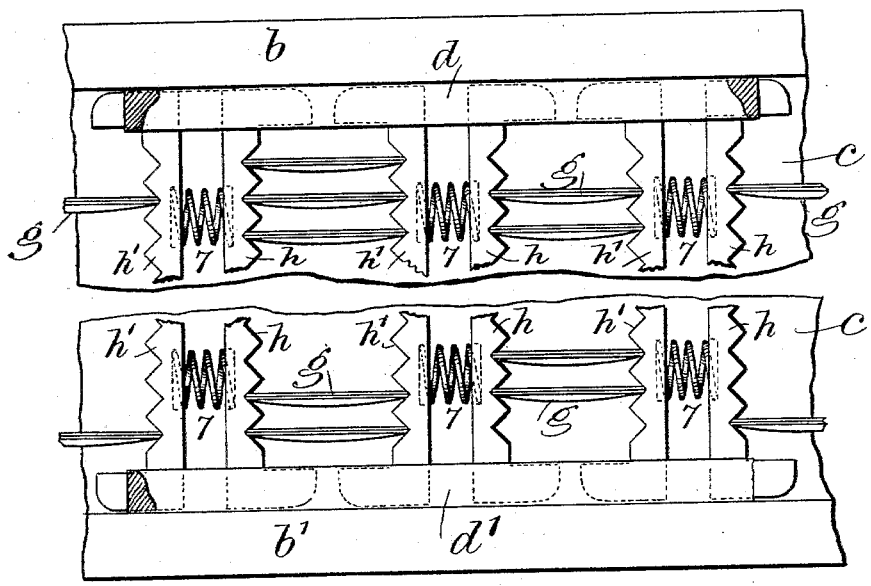
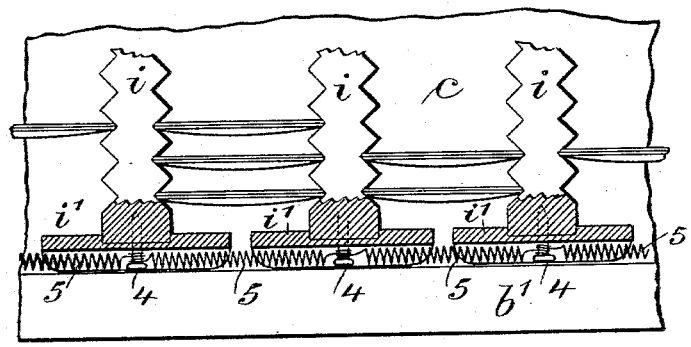
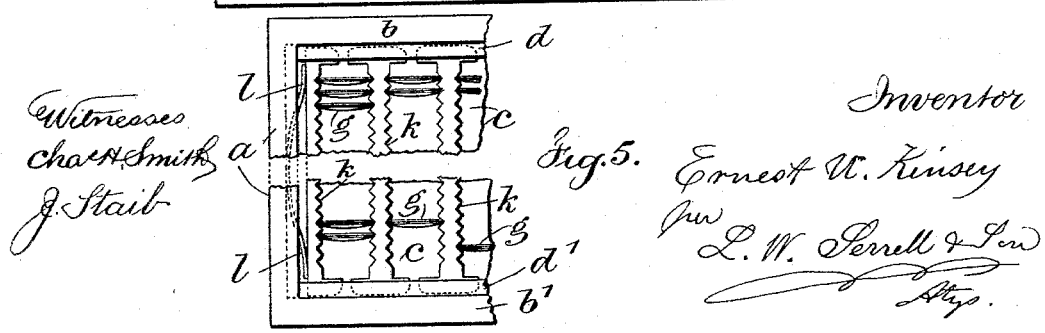
Witnesses
Chas H. Smith
J. Staib
Inventor
Ernest U. Kinsey
per L. W. Serrell & Son
Attys.

UNITED STATES PATENT OFFICE.

ERNEST U. KINSEY, OF NEW YORK, N. Y., ASSIGNOR TO EDWARD J. IRWIN, OF ENGLEWOOD, NEW JERSEY.

LENS-CABINET.

SPECIFICATION forming part of Letters Patent No. 593,024, dated November 2, 1897.

Application filed December 21, 1896. Serial No. 616,370. (No model.)

*To all whom it may concern:*

Be it known that I, ERNEST U. KINSEY, a citizen of the United States, residing at New York, in the county and State of New York, have invented a new and useful Improvement in Lens-Cabinets, of which the following is a specification.

In cabinets for holding spectacle and eyeglass lenses as heretofore constructed the grooved division-pieces have been fixed according to the size of the lenses to be received and held between said division-pieces. These conditions of fixedness and lack of adjustment it is the object of my present invention to overcome.

In carrying out my invention the grooved division-pieces are adapted to slide sidewise and are yielding, through the medium of springs, to receive and frictionally hold rows of similar lenses of any size in their grooves. Some or all of these grooved division-pieces are movable within the cabinet in ways formed between the bottom and strips secured to the inner faces of the ends. These division-pieces have ends at right angles secured to them and the ends of the movable division-pieces slide in the ways of the cabinet. Springs of various forms may be employed to yield as the division-pieces are moved by the insertion of the lenses, as hereinafter more particularly described. The grooves of the division-pieces are V shape, so as to hold the lenses at their edges and not touch their faces.

In the drawings, Figure 1 is a broken plan and partial section representing my invention. Fig. 2 is a vertical section at the line *x x* of Fig. 1. Fig. 3 is a broken plan and partial section illustrating one form of my invention. Fig. 4 is a similar view of another form of my invention; and Fig. 5 is a partial plan, in smaller size, of still another form of my invention.

The lens-cabinet is made with sides *a a'*, ends *b b'*, and bottom *c*. These parts may be of any size in either direction, and the strips *d d'* are secured upon the inner faces of the ends *b b'*, and the lenses are shown at *g*.

In Figs. 1 and 2, *e* represents the stationary grooved division-pieces secured by nails, as shown, or in any other convenient manner, and *f* the movable grooved division-pieces. These grooved division-pieces have cross or right-angle pieces *e' f'* at opposite ends thereof. These cross or right-angle pieces are longitudinally channeled, the various channels agreeing or being in line, and pins 2 are inserted in the stationary pieces *e* and pins 3 in the movable pieces *f*, and helical springs 1 are at their respective ends connected with said pins 2 and 3, the contractile action of which operates to draw the movable pieces toward the stationary pieces and open the gap between the respective movable pieces.

In Figs. 1 and 2 I have shown spectacle or eyeglass lenses of different sizes inserted between the movable and stationary division-pieces in the grooves of said pieces, the action of said lenses being to strain the various helical springs, so that the contractile action of said springs holds the lenses in the grooves of the division-pieces. The grooves of the division-pieces are in their opposite faces and correspond in position, and when there are no lenses in the cabinet the helical springs draw the movable division-pieces toward the stationary pieces, so that the right-angle pieces *f'* bear against the cross-pieces *e'* in their normal condition. In this cabinet lenses of the same size should be placed in the same row of receptacles between one of the stationary and one of the movable division-pieces and lenses agreeing in size; but a group of any size may be introduced in any other row of receptacles, the cabinet being adapted to hold in any one set of the receptacles corresponding lenses of any size. The grooves of the division-pieces are V shape, with one face at right angles to the other. These receive and hold the lenses at their edges, so that there is no risk of touching, scratching, or marring the faces, as with the old form of parallel-sided grooves.

In Fig. 3 one form of my invention is shown in which the grooved division-pieces are all movable and slide in the ways between the bottom of the cabinet and the strips *d d'* at their right-angled ends, and between these division-pieces *h h'* there are short helical springs 7, that press the grooved division-pieces toward one another until their right-angled end pieces touch. These springs yield with the insertion of the lenses and apply a pressure which prevents the lenses falling out of the cabinet. With this form I prefer to employ an occasional stationary division-piece similar to the pieces $e$ in Figs. 1 and 2.

In the form of my invention shown in Fig. 4 all of the grooved division-pieces $i$ are movable, each one being provided with T ends $i'$, and in these ends there are channels to receive the helical springs 5, whose respective ends are connected to the pins 4 at the center of each of the ends.

The operations of all of these cabinets are practically identical.

Fig. 5 shows on a small scale a form of my invention in which the grooved division-pieces $k$ are movable sidewise, there being one or more bow-springs $l$ at one or both sides acting to press all of the grooved division-pieces toward each other.

My improved cabinet is illustrated without a cover or lining or completing accessory, but it is obvious that these may be provided without in any way departing from my invention.

I claim as my invention—

1. In a lens-cabinet, the combination with the sides, ends and bottom, of strips at the ends forming slideways, grooved division-pieces with cross or right-angled pieces at their opposite ends movable in said slideways, and springs for actuating said grooved division-pieces to apply a tension to hold the lenses inserted between said division-pieces, substantially as set forth.

2. In a lens-cabinet, the combination with the sides, ends and bottom, of strips at the ends between which and the bottom of the cabinet are formed slideways, the movable grooved division-pieces having right-angled pieces at their ends received in said slideways and longitudinally channeled, and helical springs in said channels and pins in the division-pieces to which the respective ends of the helical springs are fastened, said springs acting to draw the division-pieces toward each other, and upon the insertion of the lenses to exert a pressure to hold the same in place, substantially as set forth.

3. In a lens-cabinet, the combination with the sides, ends and bottom, of the strips $d, d'$ upon the respective ends and between which and the bottom of the cabinet are formed slideways, the stationary grooved division-pieces $e$, the movable grooved division-pieces $f$, the right-angled pieces $e', f'$ at the respective ends thereof, said pieces being received in the slideways and being channeled longitudinally, the helical springs within said longitudinal channels and the pins 2 and 3, to which the respective ends of the helical springs are fastened, substantially as and for the purposes set forth.

4. In a lens-cabinet, the combination with the sides, ends and bottom, of strips at the ends forming slideways, grooved division-pieces extending across the cabinet and movable in said slideways, and springs acting on said grooved division-pieces to apply a tension to hold the lenses inserted between said division-pieces, substantially as set forth.

Signed by me this 15th day of December, 1896.

ERNEST U. KINSEY.

Witnesses:
GEO. T. PINCKNEY,
HAROLD SERRELL.